United States Patent
Chapman et al.

[11] Patent Number: 5,984,494
[45] Date of Patent: Nov. 16, 1999

[54] LIGHT SHIELD FOR AN ILLUMINATION SYSTEM

[75] Inventors: Mark Garland Chapman, Ontario; Laurence Hastings Bloxham, LaVerne, both of Calif.

[73] Assignee: Jimmy G. Cook, Upland, Calif.

[21] Appl. No.: 08/831,838

[22] Filed: Apr. 2, 1997

Related U.S. Application Data

[63] Continuation-in-part of application No. 08/522,989, Sep. 8, 1995, Pat. No. 5,685,637, and a continuation-in-part of application No. 08/828,618, Mar. 31, 1997, abandoned.

[51] Int. Cl.⁶ .................................................. F21V 13/04
[52] U.S. Cl. .......................... 362/470; 362/240; 362/241; 362/245; 362/471
[58] Field of Search ................................... 362/236, 237, 362/240, 241, 242, 243, 244, 245, 247, 248, 228, 231, 470, 471

[56] References Cited

U.S. PATENT DOCUMENTS

| | | | |
|---|---|---|---|
| 1,013,947 | 1/1912 | Neil | 362/240 |
| 2,139,587 | 12/1938 | Husemoller | 362/240 |
| 2,190,035 | 1/1940 | Loungway | 177/327 |
| 2,584,292 | 2/1952 | Rogers | 362/240 |
| 2,605,384 | 7/1952 | Adler, Jr. | 362/240 |
| 3,816,739 | 6/1974 | Stolov | 240/10 |
| 4,677,533 | 6/1987 | McDermott | 362/240 |
| 4,912,334 | 3/1990 | Anderson . | |
| 4,947,291 | 8/1990 | McDermott . | |
| 4,963,798 | 10/1990 | McDermott | 315/312 |

FOREIGN PATENT DOCUMENTS

| | | |
|---|---|---|
| 359359 | 10/1931 | Australia . |
| 0 089 161 A1 | 9/1983 | European Pat. Off. . |
| 29143 | 2/1925 | France . |

*Primary Examiner*—Y. Quach
*Attorney, Agent, or Firm*—Jacobson, Price, Holman & Stern, PLLC

[57] ABSTRACT

The Dual Spectrum Illumination System (DSIS) is a modular light source having two independent emitters of optical radiation. A halogen bulb provides a high intensity visible beam. The second source of emissions is a ring of light emitting diodes (LED). The LED ring can be configured to supply area illumination, beam illumination, or a combination of area and beam illumination. The spectrum emitted by the LED is selectable from the wide range of commercially available diodes. The illumination system provides a beam and infrared area lighting using 21 high power, 6 watt, LEDs emitting at 880 nanometers mounted on the ring. Illumination control electronics are provided on a printed circuit assembly to provide the diodes with the correct current and voltage. A second embodiment of the invention is as a direct replacement for aircraft landing lights, mobile vehicle head lights, and any other situation requiring beam illumination. This embodiment of the DSIS provides high intensity beams of visible light and infrared light and is particularly suited for U.S. Air Force covert operations. The system includes a mounting plate having a plurality of receptacles that receive the LEDs. Shield are provided that each surround a portion of selected receptacles in order to block infrared light that would otherwise impinge upon the cockpit of the aircraft.

14 Claims, 11 Drawing Sheets

LIGHT SHIELD FOR AN ILLUMINATION SYSTEM

RELATED APPLICATIONS

This application is a continuation-in-part of Ser. No. 08/522,989, filed Sep. 8, 1995, now pending, and a continuation-in-part of a U.S. application Ser. No. 08/828,618 filed on Mar. 31, 1997, entitled "Dual Spectrum Illumination System Having a Light Shield", now abandoned.

BACKGROUND OF THE INVENTION

1. Field of the Invention

This invention relates to lighting, and particularly to the illumination of areas or beam lighting for use as aircraft landing lights and automobile headlights.

2. Description of the Prior Art

Heretofore, when a lamp, such as a sealed beam incandescent bulb, was used to provide a specific band of electromagnetic radiation, a filter or cold mirror was used to block the unwanted wavelengths. However, the filter or cold mirror trapped heat and the bulb operated at a temperature above the intended operating range. Consequently, the bulb burns out if operated for more than about 15 to 20 minutes and the excessive heat shortens the expected lifetime of the bulb by about 50%. In addition, changing the active spectrum required manual effort or a complex mechanical device to insert or remove the filter.

Another approach uses a dual bulb made with the reflecting surfaces pointing in opposite directions. To change the active spectrum, again a man or a complex mechanical device is needed to rotate the bulb. This approach requires a unique fixture and has relatively high cost.

Another fixture built for use on aircraft consists of four sealed beam lamps, two with cold mirrors and two unfiltered. The fixture, however, is a large complex assembly that is expensive to install on aircraft and also suffers from the bulb overheating problem described above.

Other lights are made using arc lamps, but these are also broad band and require filters with the same difficulties noted above to select specific bands of the spectrum.

SUMMARY OF THE INVENTION

Accordingly, it is a primary object of the invention to provide a modular light source particularly suited for use as aircraft landing lights, mobile land vehicle headlights, indoor or outdoor area illumination, and for use in like devices.

Another object of the invention is to provide a landing light having infrared light that does not interfere with night-vision systems, especially night-vision goggles used by a pilot.

The invention provides two independent emitters of electro-magnetic radiation. One of the emitters is a halogen bulb that provides a high intensity visible beam of light. A second source of emissions is a ring of light emitting diodes (LED). The ring can be configured to provide area illumination, beam illumination, or a combination of area and beam illumination. The spectra emitted by the LED ring is selectable from the wide range of commercially available devices. The user can easily switch between the two available spectrum with an electrical switch. This ease of spectra selection has not been previously available.

A dual spectrum illumination system is comprised of two independent modular sources of illumination. Upon activation by an operator or user, the selected light source provides a high intensity beam of visible light, preferably by a halogen lamp. Alternatively, the user may select a high intensity beam or area illumination of infrared radiation, ultraviolet radiation, or any other region of the spectrum that can be produced by light emitting diodes. The diodes are mounted on a ring that circumscribes the halogen bulb. This ring accommodates many LED configuration. The dual spectrum illumination system is manufactured to be compatible with fixtures currently in use that house sealed beam and halogen lamps that only provide visible light. The selection of a specific spectra is accomplished all electronically and no mechanical action is necessary.

The advantages are extremely significant when the dual spectrum illumination system is used as a landing light for aircraft. The invention is a form, fit, and multi-function replacement for the standard aircraft landing light 4559. The installation of the invention on an aircraft only requires adding a three position switch and a single wire from the switch to the landing light.

The pilot can select to perform a normal landing by activating the halogen lamp, or he can decide to perform a covert landing by turning on the second spectra. For example, the LED ring can be populated by high power infrared light emitting diodes ("LED"). LED light is invisible to the naked eye and night vision goggles must be used to see. The aircraft may land with the invisible landing light and cause minimal disturbance to the native population at the landing site.

The use of light emitting diodes solves the over heating problem and short operating lifetime of sealed beam lamps associated with the use of filters and cold mirrors. The LED has an expected lifetime of about 100,000 hours and will not over heat when operated with the current voltage and current.

The dual spectrum illumination system is designed to be interchangeable with landing lights currently in use on aircraft. Only one additional wire and a selection switch must be added to the current assembly. This is a significant advantage over the extensive modifications required to use mechanical filters and cold mirrors, wherein the bulb must be rotated, or the large and visible light having four sealed beam lamps, two with cold mirrors and two unfiltered.

The invention has special advantages for the U.S. Air Force. To an observer, a dual spectrum illumination system appears to be a normal aircraft landing light. The invention is less obtrusive than any prior art and is covert when used on aircraft equipped for night vision capable operations.

These together with other objects and advantages which will become subsequently apparent reside in the details of construction and operation as more fully hereinafter described and claimed, reference being had to the accompanying drawings forming a part hereof, wherein like numerals refer to like parts throughout.

Selected Reference Numerals 10 a protective lens
12 a LED mounting plate
14 a LED printed circuit assembly
16 an illumination controller printed circuit assembly
18 a halogen lamp
20 an electrical power conditioning and retaining ring
22 input terminals
24 seven current limiting resistors
26 40106 hex Schmitt trigger integrated circuit
28 high power light emitting diodes, OD669
30 N-channel MOSEFETs
32 OD50L light emitting diodes
34 plano-convex lens
36 halogen bulb

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical and legal equivalents.

Figure 1:
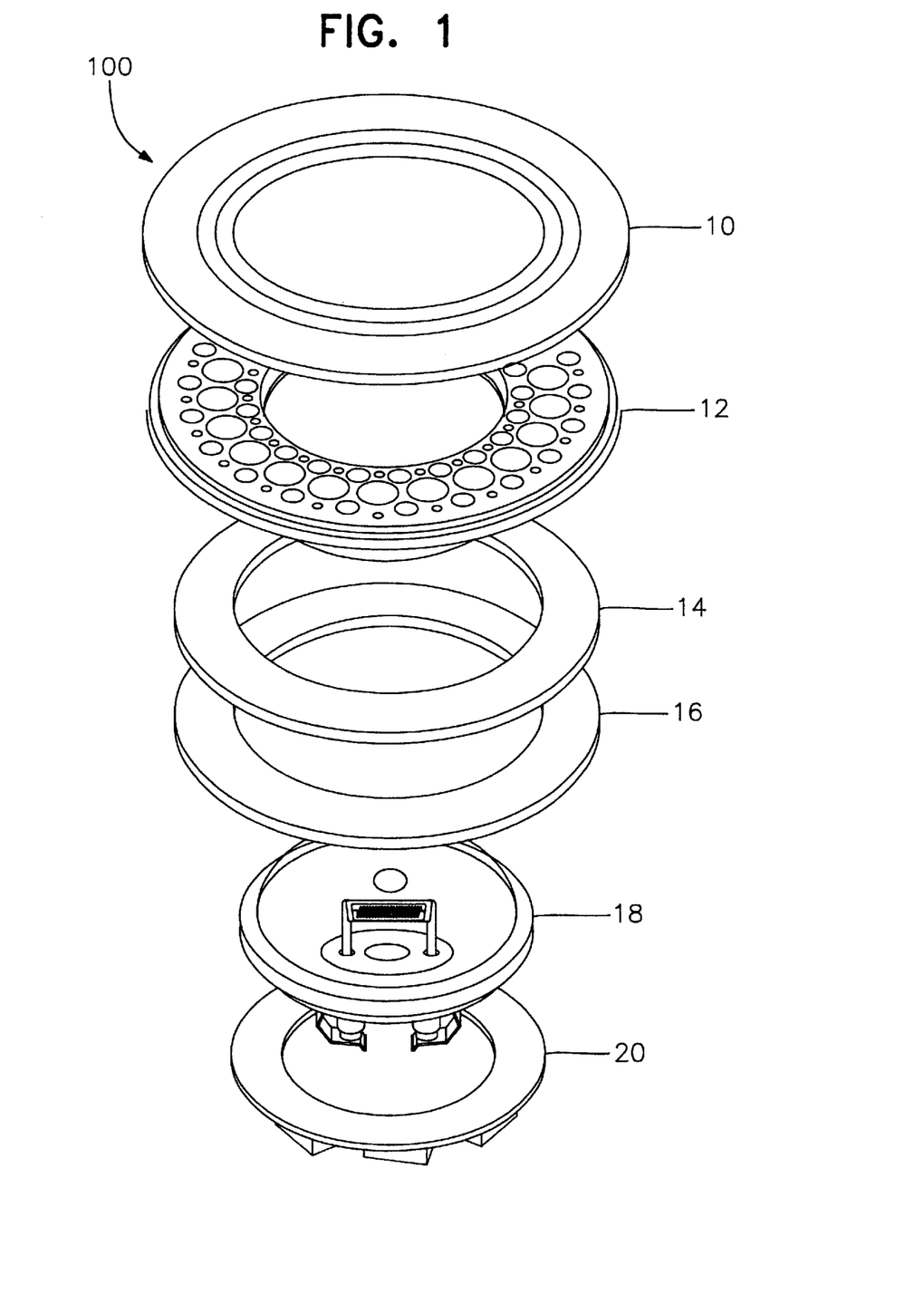
FIG. 1 is an exploded perspective of the Dual Spectrum Illumination System in accordance with the preferred embodiment of the invention.

As shown in FIG. 1, a Dual Spectrum Illumination System 100 is a modular light source. The Dual Spectrum Illumination System 100 consists of a protective lens 10, a LED mounting plate 12, a LED printed circuit assembly 14, and illumination controller printed circuit assembly 16, a visible illumination module, with a halogen lamp 18 as the principal component, and an electrical power conditioning and retaining ring 20. The illumination system provides two independent emitters of electro-magnetic radiation. The illumination system is controlled by a three position switch (OFF-ILLUMINATION 1-ILLUMINATION 2) (not shown). The selection of a specific illumination is accomplished with the simple three position switch, no complex mechanical or manual operation is required. The LED mounting plate 12 and the LED printed circuit assembly 14 may be configured to accommodate many different light emitting diodes.

The Dual Spectrum Illumination System 100 is designed to be used as a direct replacement for sealed beam lamps used on mobile vehicles. The initial application of the illumination system 100 is as a replacement for the standard 4559 landing light used on aircraft. The illumination system 100 provides both conventional visible illumination, as well as night vision capable illumination. The illumination system 100 is intended to be used during take-off and landing, as well as during operations while on the ground. The Dual Spectrum Illumination System 100 is designed to be easily converted to operate with a wide variety of light emitting diodes, in anticipation of the future, when night vision goggles will respond to light at wavelengths different from the current designs.

Figure 2:
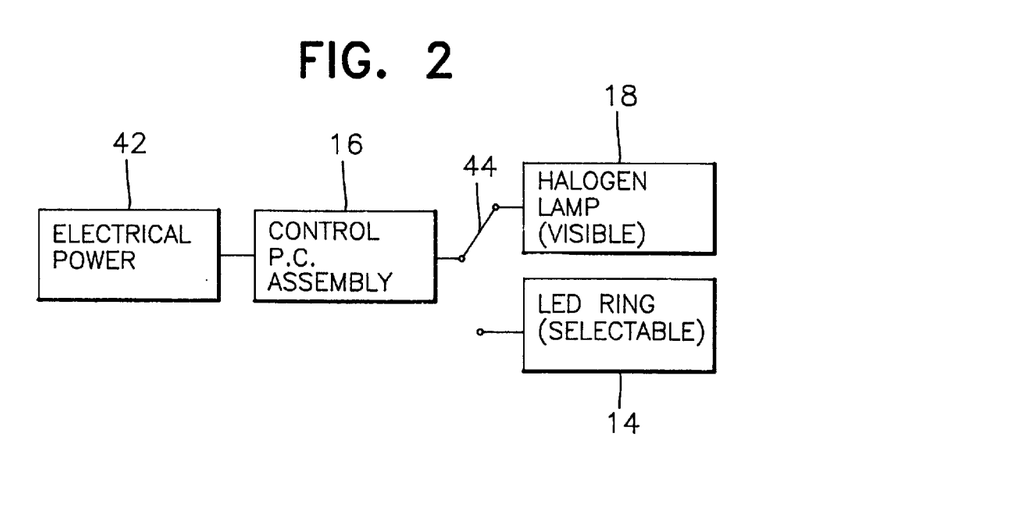
FIG. 2 is a block diagram of the system.

FIG. 2 shows a block diagram of a Dual Spectrum Illumination System 100 (DSIS). Electrical power 42 is supplied through the mode selection switch 44. The selection switch 44 determines the mode of operation of the system 100 by allowing the user to select the desired spectrum of light. The selection of visible illumination causes power to flow directly from the power supply 42 to the halogen bulb 18. The selection of a second spectrum activates the illumination control printed circuit assembly 16. The illumination controller 16 generates pulsed power at the correct voltage and duration for the optimum operation of the light emitting diodes 28, 32.

Figure 3A:
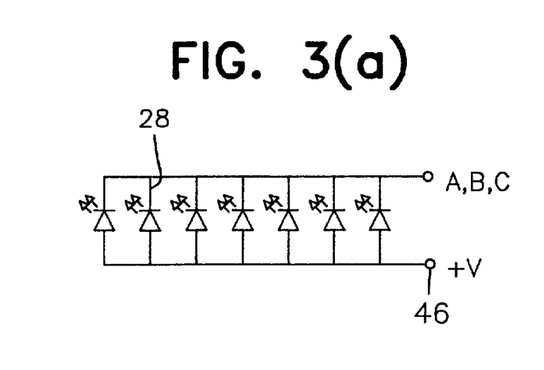
FIGS. 3a–3c are schematics of the electrical circuit of the invention.
Figure 3B:
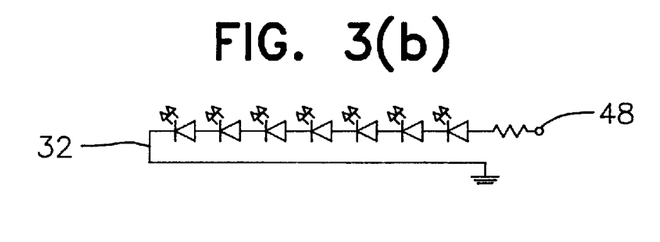
Figure 3C:
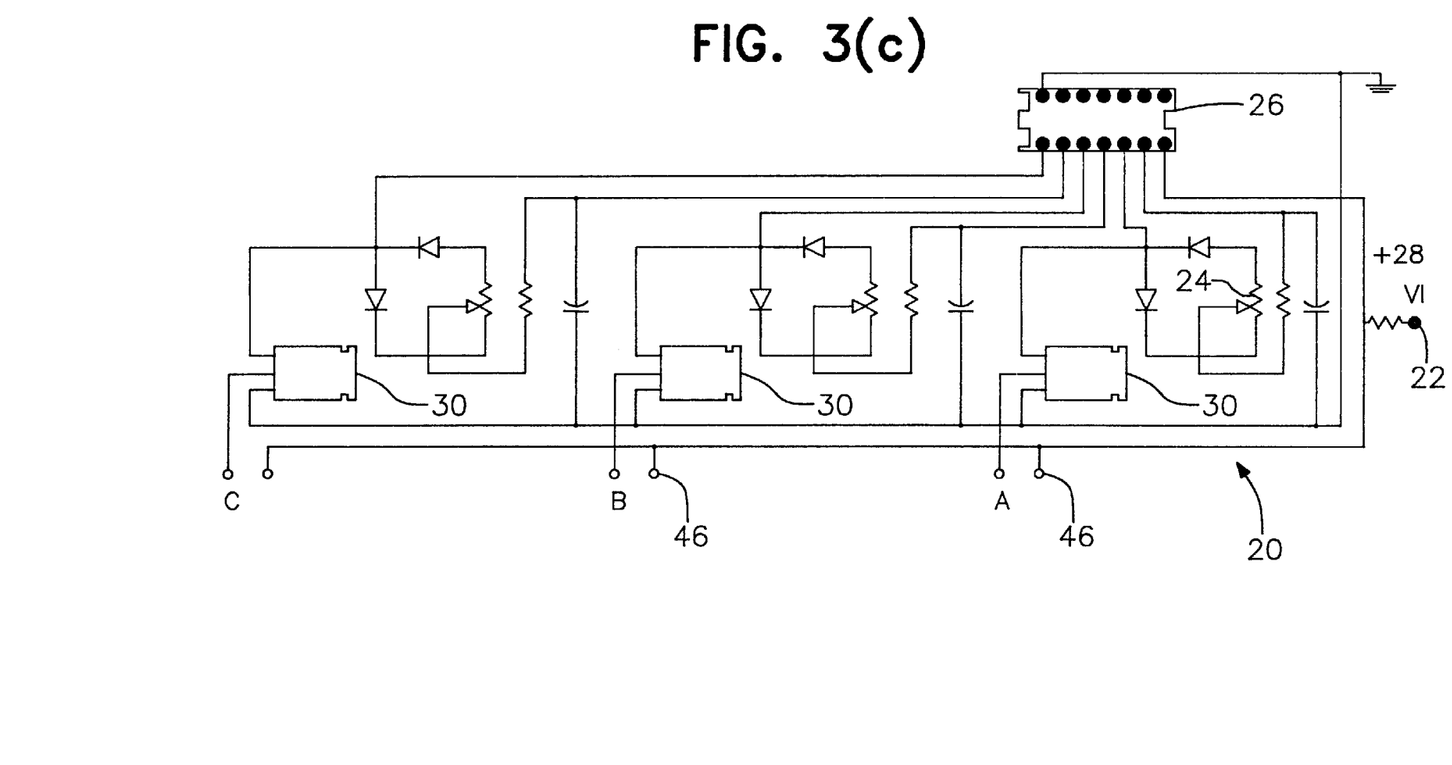

Now referring to FIGS. 3a–3c, a schematic for a Dual Spectrum Illumination System 100 is shown. Construction and use will be easily apparent to those skilled in the art given the values and interconnections shown, so it will not be discussed in great detail. A power supply will be selectively matched to the available main electrical power 42. The first Dual Spectrum Illumination System 100 was built for use on an aircraft that was wired to supply 28 VDC to the landing lights.

The power conditioning ring, item 20 on FIG. 1, receives the DC power via input terminals 22 and supplies DC power through seven current limiting resistors 24. Six of the resistors 24 are each directly connected to a series circuit of seven OD50L light emitting diodes 32 at terminals 46. Only one of these identical circuits is shown in FIG. 3b. The seventh resistor 24 connects to the illumination control circuit 16. The illumination control circuit 16 uses a standard 40106 hex Schmitt trigger integrated circuit 26 to generate pulses that switch the power used to drive the twenty-one high power light emitting diodes OD669 28, on the LED printed circuit assembly 14.

The variable resistors 24 control the pulse length and duty cycle of the timer. The circuit 26 uses three identical N-channel MOSFETs 30 that each supply power to seven of the light emitting diodes OD699 28, which are wired in parallel. These three circuits 26 are indicated by the letters A, B, C on the schematic. The MOSFETs 30 switch in response to the signals generated by the 40106 trigger 26 and each MOSFET 30 supplies about 13 VDC in 10 microsecond pulses at a duty cycle of 50%. When the switch 44 is positioned to turn on the halogen bulb lamp 18, a constant 28 VDC is supplied to the halogen bulb 36.

Figure 4:
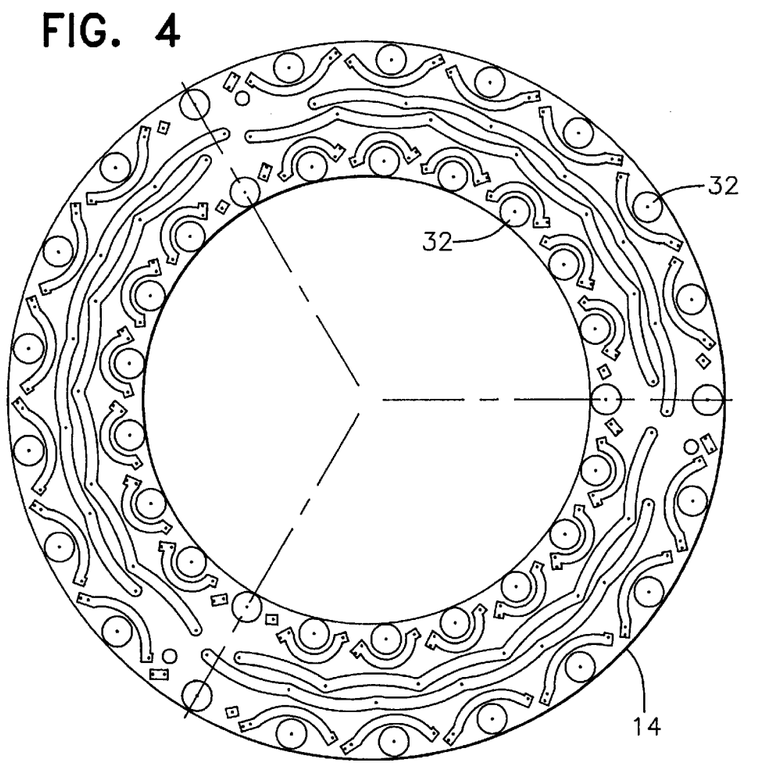
FIG. 4 is a top view of the circuit side of the light emitting diode ring.

The circuit side of the light emitting diode (LED) printed circuit assembly 14 is shown in FIG. 4. The nine circuits connecting the light emitting diodes are shown. Around the inner and outer edges are the six circuits of seven OD50L LEDs 32 connected in series. The center of the ring has the three circuits of seven OD669 high power LEDs 28 connected in parallel. The first Dual Spectrum Illumination System 100 built used these sixty-three light emitting diodes 28, 32. Twenty-one were high power OD669 LEDs 28 with power output of 6500 milliwatts each. Forty-two are OD50L LEDs 32 that emit 500 milliwatts each for a total output of 157.5 watts of infrared illumination. Each light emitting diode OD669 28 is aligned with a plano-convex lens 34 on the LED mounting plate 12 to collimate and direct the infrared into a beam appropriate to illuminate landing fields.

Figure 5:
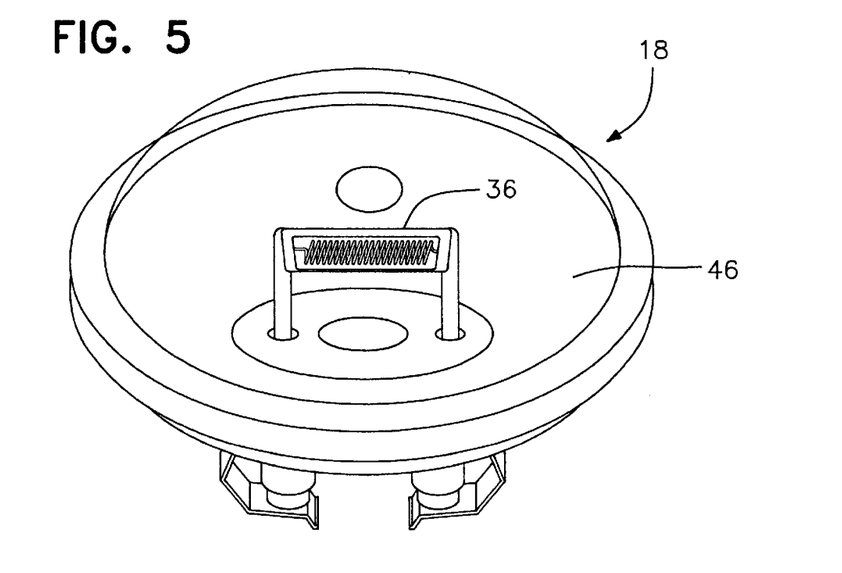
FIG. 5 is a perspective of the halogen lamp used in the system of FIG. 1.

The halogen lamp 18 is shown in FIG. 5. The 450 watt halogen bulb 36 is mounted near the focal point of a circular reflector 46. The reflector shapes the isotropic emissions from the halogen bulb to a beam for illuminating landing fields.

Figure 6:
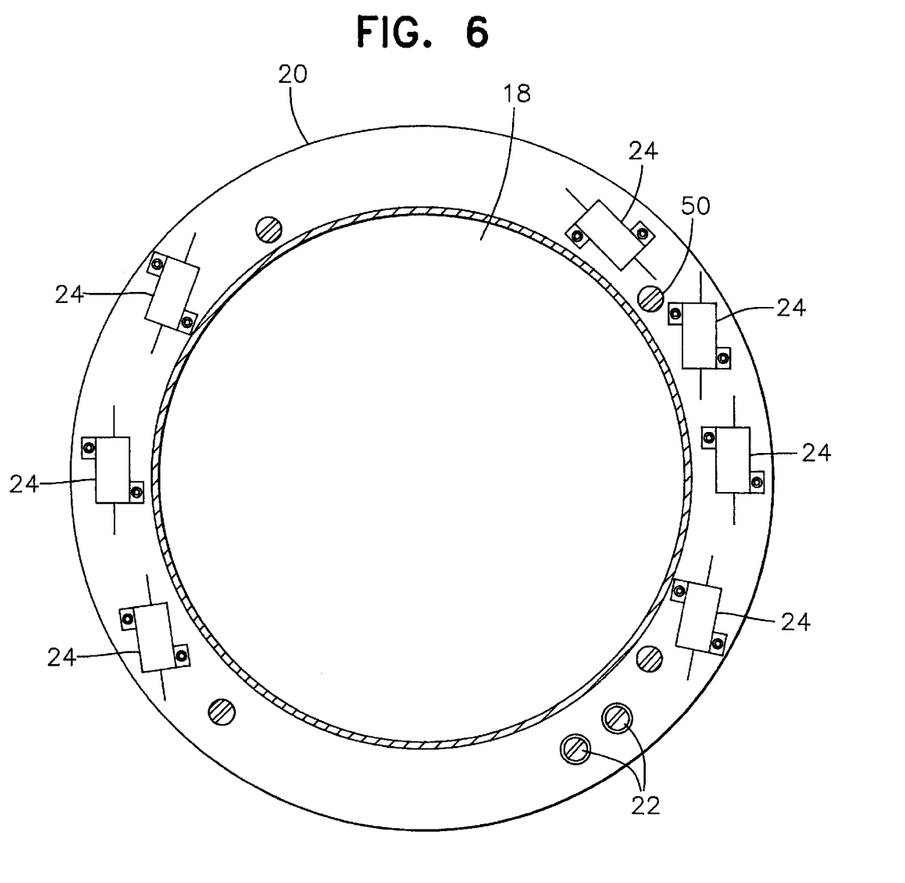
FIG. 6 is a top view showing the power conditioning and retaining ring used in the system shown in FIG. 1.

FIG. 6 shows the electrical power conditioning and retaining ring 20. The 28 VDC electrical power is connected to the terminals 22. The seven power limiting resistors 24 are mounted on the ring 20. The ring 20 is fastened to the LED mounting plate 12 by screws 50 which retain the halogen lamp 18 in position. This structure provides the necessary strength to operate in severe environmental conditions, such as are present on the wing of an aircraft.

Figure 7:
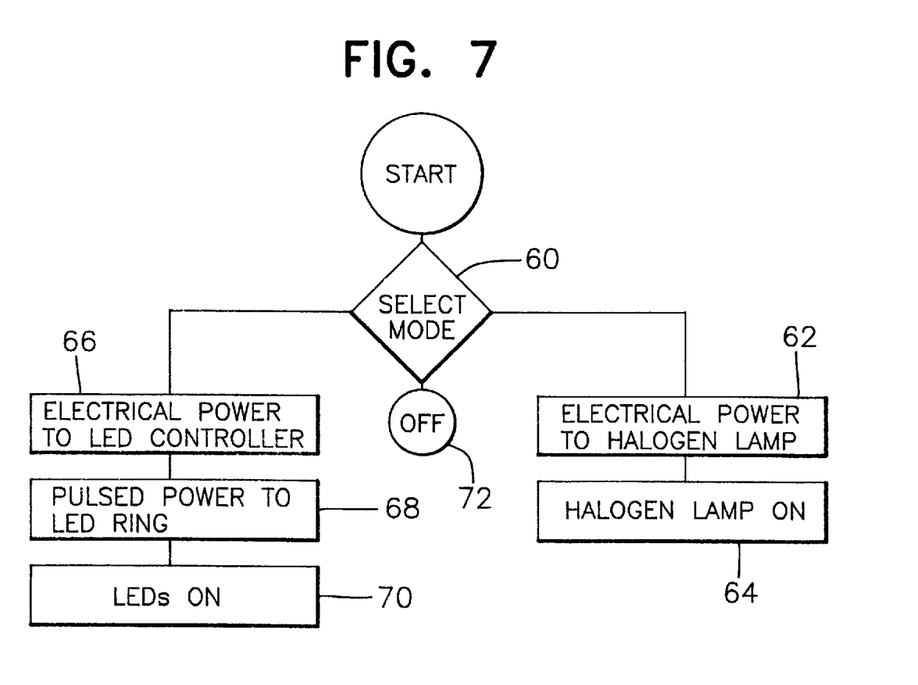
FIG. 7 is an operational flow chart for the invention.

FIG. 7 shows the sequence of operations that occur to control the Dual Spectrum Illumination System 100. The pilot has the option to select one of three options, off/visible/infrared, by setting the switch 44.

Figure 8:
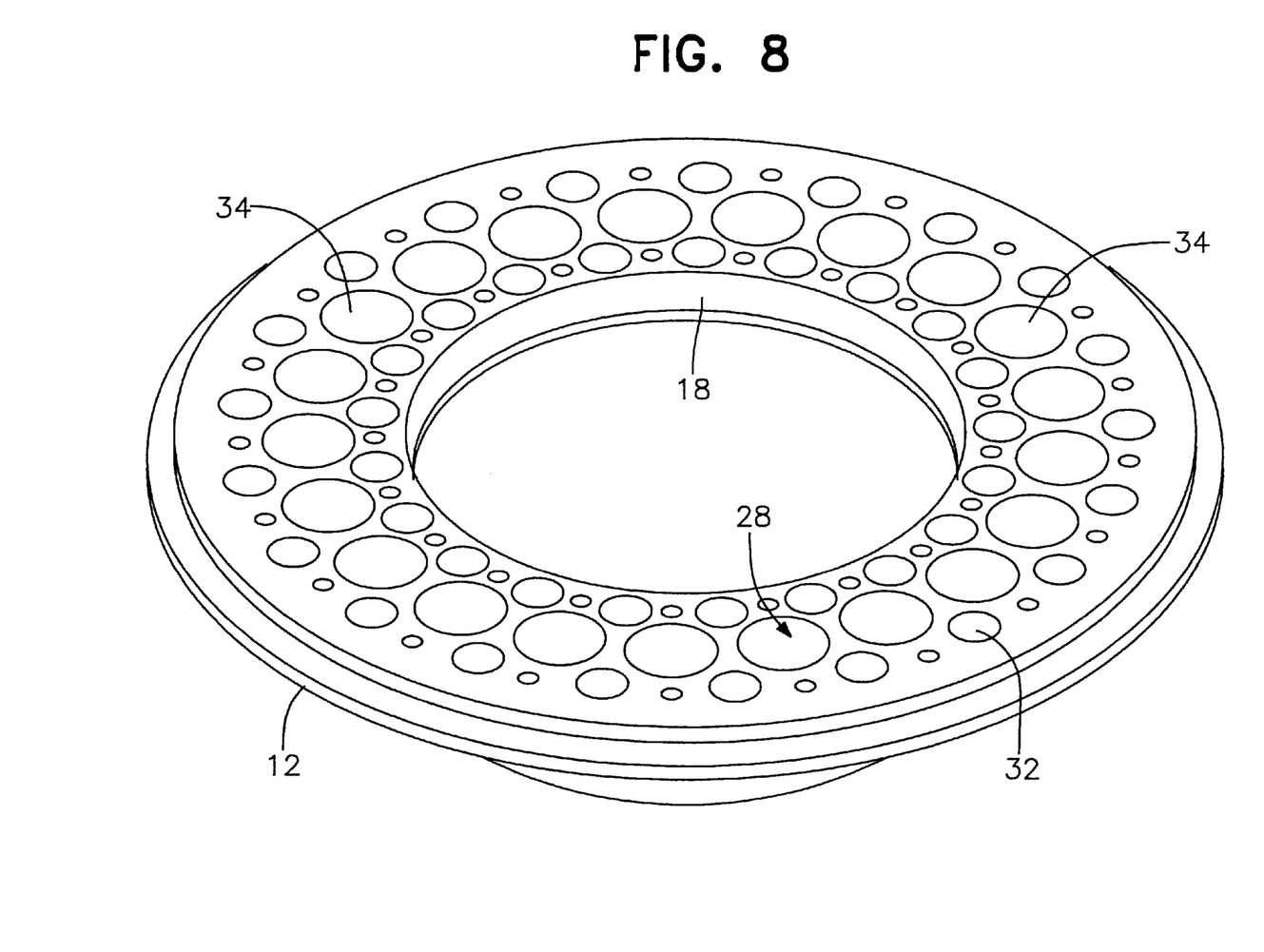
FIG. 8 is a perspective view of the LED mounting plate of the invention of FIG. 1.

FIG. 8 is a sketch of the assembled invention in perspective view. The halogen lamp 18 with bulb 36 is mounted in the center. Surrounding the bulb 36 is the LED ring 12. Mounted on the under side of the ring 12 are the forty-two OD50L 32, and the twenty-one OD669 28 light emitting diodes. The lenses 34 for the OD669 are mounted on the top of the ring and collimate the infrared light emitted by the diodes 28.

Figure 9:
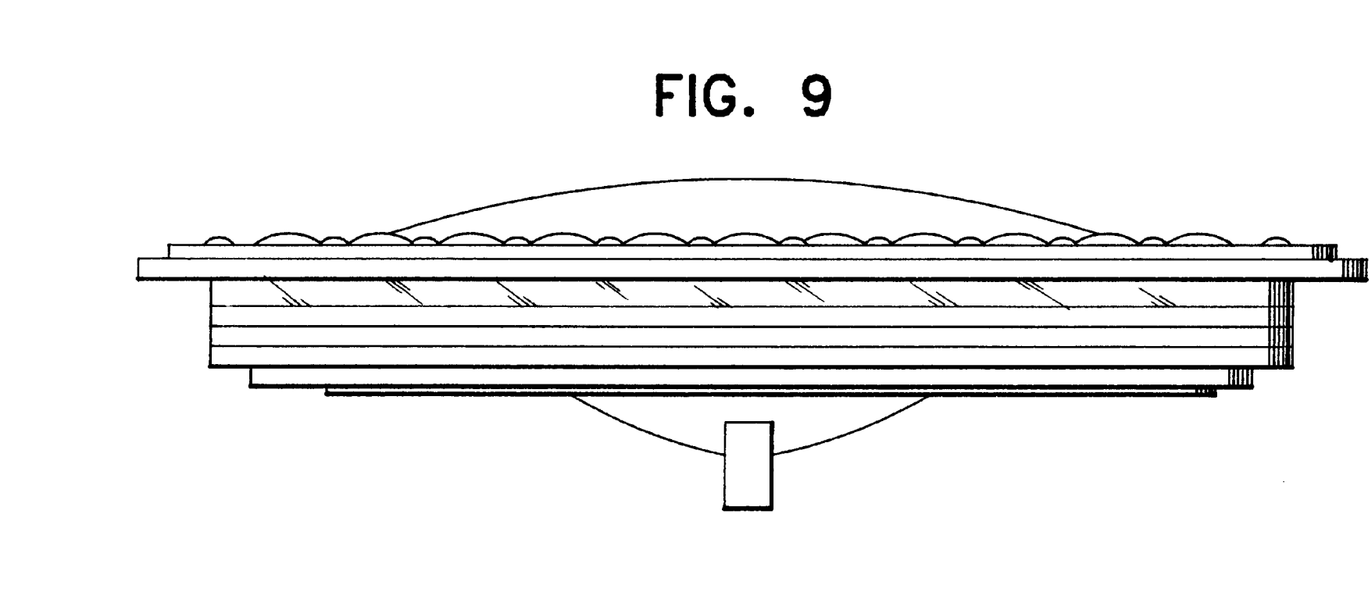
FIG. 9 is a side view of the system shown in FIG. 1.

FIG. 9 shows the side view of the assembled invention. The current limiting resistors 24 are omitted for clarity. The size, shape, weight, and electrical requirements are compatible with all lamp housing used to hold the standard aircraft landing light PAR 4559.

The operation of the Dual Spectrum Illumination System 100 will now be described. When the pilot or operator sets switch 44 to the visible illumination position, the circuit, as shown in FIG. 2, is closed, thereby activating the halogen bulb 36. The bulb 36 remains on continuously until the switch 44 is repositioned. When the switch 44 is set to the invisible illumination position, the circuit for the LED printed circuit assembly 14 is closed and current flows to the current limiting resistors 24 on the electrical power conditioning and retaining ring 20. The 42 LEDs OD50L 32 are driven directly in 6 circuits of seven LEDs each. The seventh resistor is connected to the LED control circuit, which pulses power to activate the OD669 LEDs 28 mounted on the ring. The second spectrum illumination is emitted until switched off.

Accordingly, it can be seen that, a system 100 is provided to illuminate aircraft take-off and landing fields, mobile vehicle roadways, and other areas with either of two user selectable bands of the electromagnetic spectrum. The invention is modular and can be easily reconfigured to provide different bands of illumination. A high intensity visible beam is available, as is a narrow band spectrum emitted by a ring of light emitting diodes. The diodes may be infrared emitters for use with night vision goggles, or ultraviolet emitters for use with image intensifiers. Preferably, the diodes may be red, yellow, green, blue or any other color for monochrome visible lighting. An optical system with lenses to shape the LED illumination may also be used to achieve specific intensity profiles.

Although the description above contains many specificities, these should not be construed as limiting the scope of the invention but as merely providing illustrations of some of the presently preferred embodiments of this invention. Various other embodiment and ramifications are possible within it's scope. For example, a dual spectrum illumination system could be used in a security system. At night the secure area could be flooded with invisible infrared or ultraviolet radiation. Suitable sensors would survey the area and when unauthorized entry was detected, the visible lamp would be switched on to illuminate the intruder. The dual spectrum illumination system can also be a covert broadcast transmitter. By replacing the 40106 Schmitt triggers 26 with a digital data stream using on off keying or other suitable modulation scheme, the invention can transmit digitized voice, video, or data messages.

Figure 10:
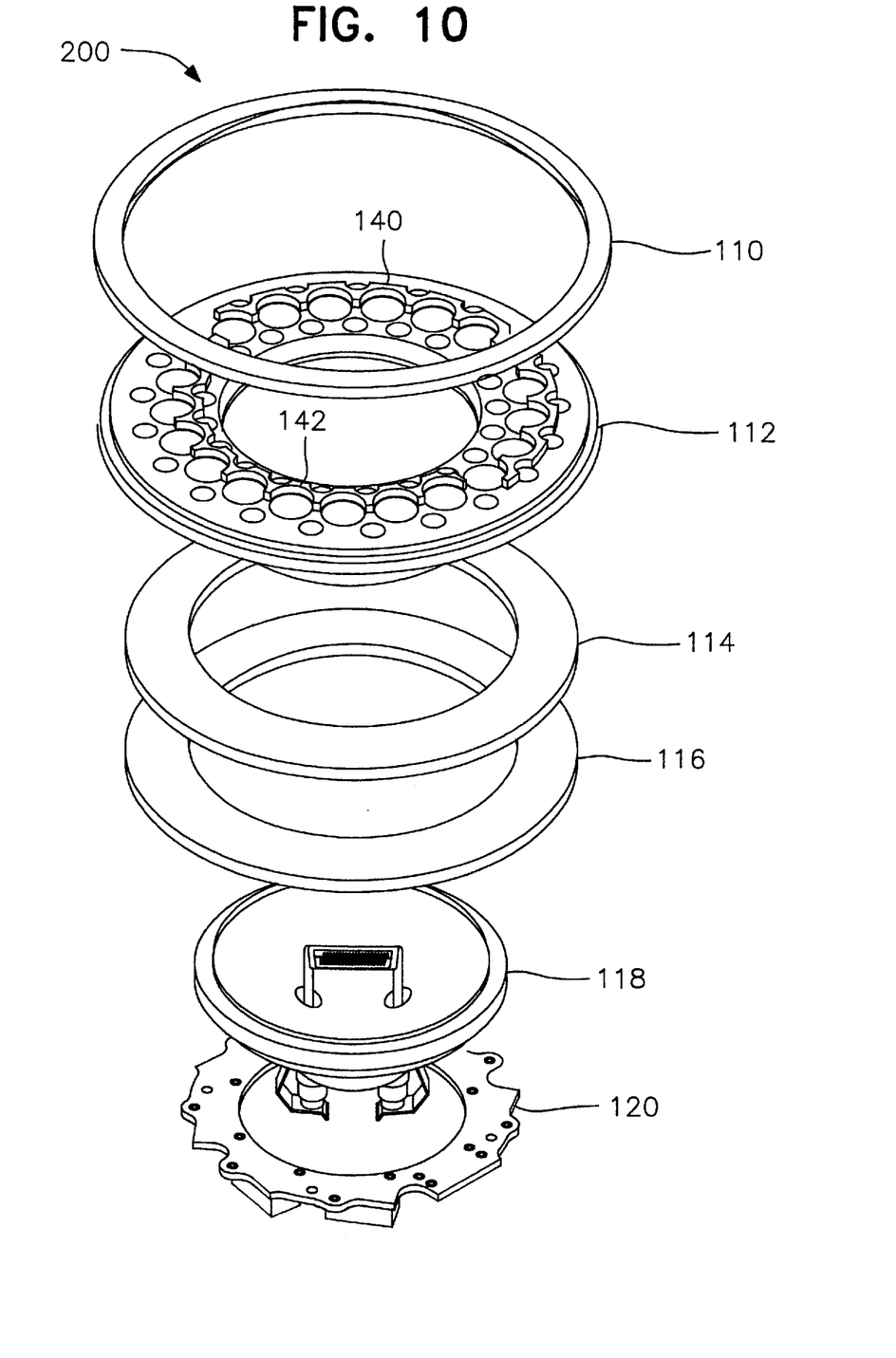
FIG. 10 is an exploded perspective view of an alternative embodiment of the dual-spectrum illumination system in accordance with the invention.

Turning to FIG. 10, an alternative embodiment of the illumination system 200 will now be discussed. As in FIG. 1, the system 200 generally includes a protective lens 110, LED mounting plate 112, LED printed circuit assembly plate 114, illumination controller 116, halogen lamp 118, and power conditioning and retaining ring 120.

However, it has been discovered that infrared light emitted by LEDs 128 and 132 may impinge upon the cockpit of the aircraft. Though infrared is invisible to the human eye, it causes interference with the use of night-vision goggles (and like devices). Many night-vision devices, such as goggles worn by pilots, and particularly night-vision devices having auto-gain, automatically adjust sensitivity based upon ambient light conditions. Consequently, as a greater amount of infrared light emitted by LEDs 128 and 132 paints the cockpit, the sensitivity of the night-vision goggles diminishes accordingly. Thus, the sensitivity of the goggles will not accurately reflect the actual available light encountered by the pilot, thereby reducing effectiveness of the night-vision goggles.

Figure 11:
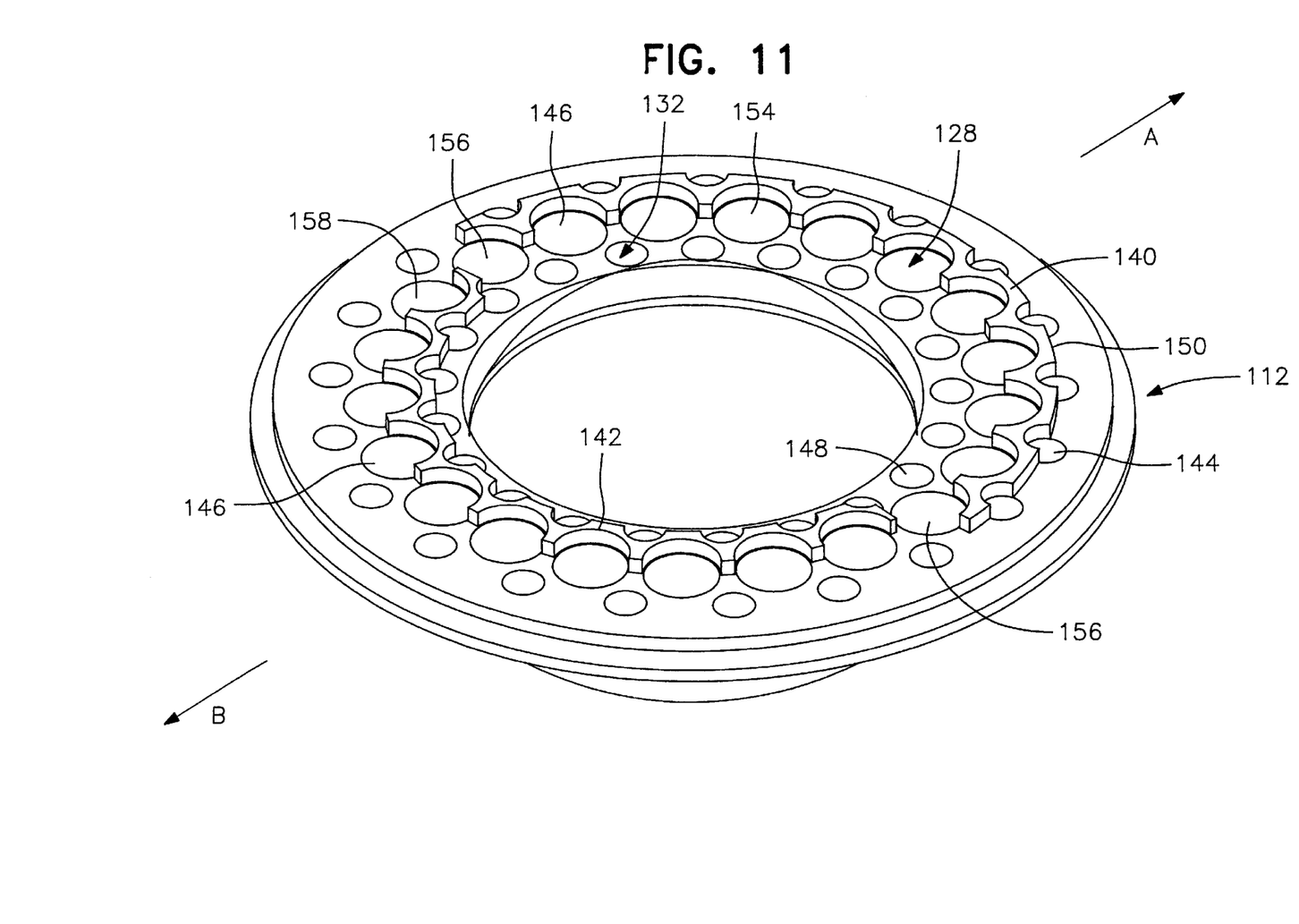
FIG. 11 is a perspective view of the LED mounting plate in accordance with an alternative embodiment of the invention.

Accordingly, system 200 is designed in order to reduce the amount of infrared light that reaches the cockpit. Inner and outer bridge members or shields 140, 142 are configured integral with the LED mounting plate 112, as best shown in FIG. 11. The inner shield 140 and outer shield 142 generally comprise a flat metal plate that extends out, preferably perpendicular, from the top surface of the LED mounting plate 112. Each of the inner shield 140 and the outer shield 142 extend around approximately one-half of the mounting plate 112.

Figure 12:
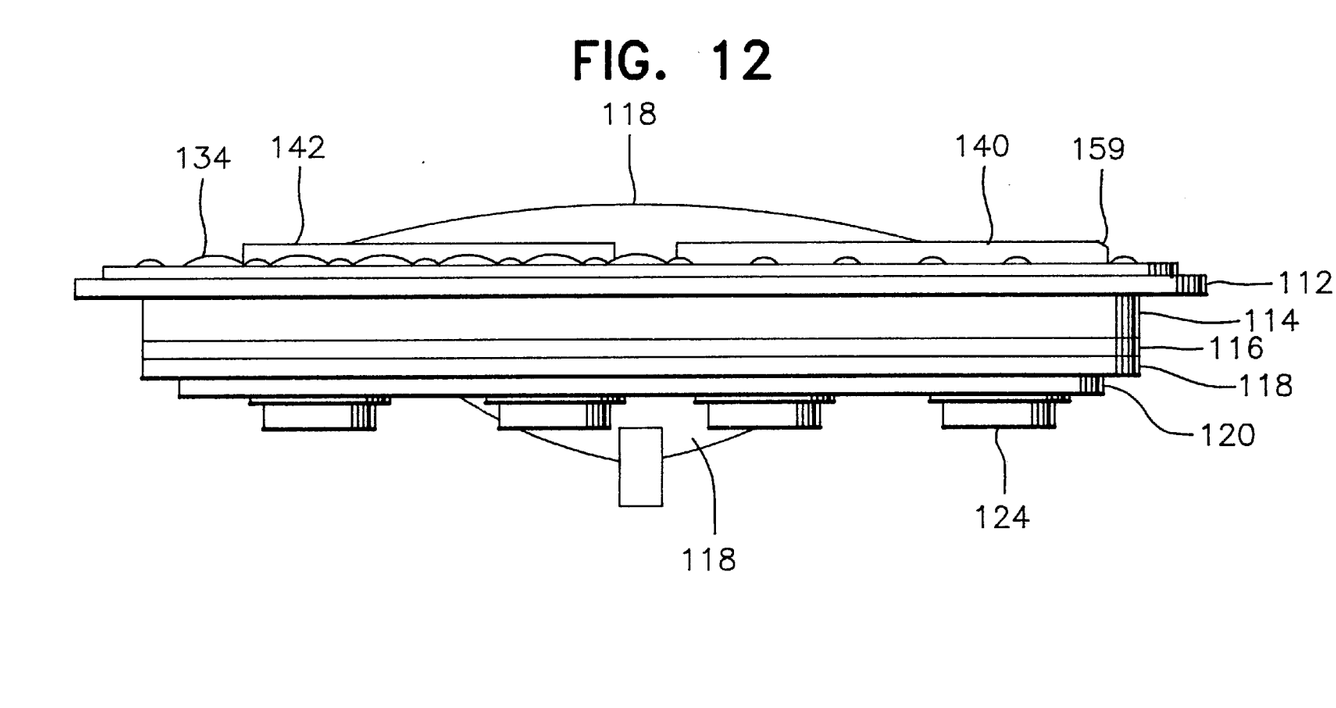
FIG. 12 is a side view of the dual-spectrum illumination system in accordance with the alternative embodiment of the invention shown in FIG. 10.

Shields 140, 142 are particularly useful in conjunction with lenses 134, which direct and focus light emitted by LEDs 128, 132, in order to direct light away from the cockpit. Nevertheless, the lenses 134 themselves, which preferably are fitted in, and protrude slightly from receptacle 142 (as shown in FIG. 12), still leak some infrared light that reaches the cockpit. The combined use of lenses 134 and shields 140, 142 significantly reduces the amount of light that impinges on the cockpit.

The shields 140, 142 cooperate to block and otherwise collimate infrared light emitted by LEDs 128, which are fitted in the middle tier or ring of receptacles 146. The system 200 is then mounted, for instance, on the underside of an airplane wing, so that the inner shield 140 is toward the body of the aircraft (not shown), which is generally indicated by arrow A, and especially faces the cockpit. The inner shield 140 preferably encompasses the receptacles 146 that are located closest to the cockpit. More particularly, inner shield 140 is scalloped to encircle one-half of nine receptacles 154 and one-quarter of two additional receptacles 156. Similarly, the outer shield 142 is scalloped to encompass one-half of the ten receptacles 158 that are located furthest from the body of the aircraft. Thus, the outer shield 142 will be nearer to the tip of the wing (as indicated generally by arrow B), and the inner shield 140 will be nearer the body of the aircraft.

The shields 140, 142 thus reduce the amount of light that progresses toward the cockpit by blocking or otherwise re-directing light emitted from LEDs 128. This reduces the glare of infrared light encountered by night vision devices. Preferably, the shields 140, 142 are only used to block light emitted by LEDs 128, since those emit the greatest amount of infrared light. LEDs 132, on the other hand, do not output a significant amount of infrared light, and do not significantly affect the use of night-vision devices. However, additional shields may also be provided about receptacles 144, 148 in order to reduce the amount of infrared light emitted by LEDs 132 that reaches the cockpit.

In a preferred embodiment of the invention, the scalloped inner shield 140 extends along a portion of the periphery of the outer ring of light receptacles 144, as well as along a portion of the periphery of the middle ring of light receptacles 146. Preferably, the inner shield 140 surrounds the portion of the receptacle 146 from which light is emitted that would otherwise impinge upon the cockpit. The opposite side of the receptacle 46 is left unobstructed. Comparatively, the scalloped outer shield 142 extends along the periphery of the inside ring of light receptacles 148 and the middle ring of light receptacles 146. As with the inner shield 140, the outer shield 142 directs or blocks light emitted from LEDs 128 located in the middle ring of receptacles 146 that would otherwise impinge on the cockpit of the aircraft.

Accordingly, inner and outer shields 140, 142 each surround about one-half of each receptacle 146. The inner shield 140 is shown located about the half of each receptacle 146 that is furthest from the center of the mounting plate 112. Similarly, outer shield 142 is positioned about the half of each receptacle 146 that is nearest the center of the mounting plate. However, the shields 140, 142 may also be configured to circumscribe or encircle the one-half portion of each receptacle 146 that is closest to the cockpit of the aircraft, so as to more closely block light that has the greatest probability of otherwise reaching the cockpit.

Thus, the shields 140, 142 are effective to directionally obstruct stray light, without unnecessarily reducing the effectiveness of LEDs 128, 132. In addition, the shields 140, 142 only partially cover the top surface of the mounting plate 112, so that there is a significant reduction in the amount of material required, and the weight of the system 200 is minimized.

In the preferred embodiment, the shields 140, 142 are metal, though may comprise any suited material that blocks light, though is able to withstand extreme temperature variations and hostile weather conditions of the particular light system application. In addition, although the shields 140, 142 are preferably integral with mounting plate 112, they may each also be a separate metal plate that is affixed to mounting plate 112 by a commercial adhesive.

In addition, the entire top inside edge 150 of the inner shield 140 may be sloped at about a forty-five degree angle to form a beveled face 159. The beveled face 159 prevents the shield 140 from coming into contact with the protective lens 110. In addition, the beveled face 159 may reduce any obstruction of light that is emitted from LEDs 132, which are located in receptacles 144, 148. Though shields 140, 142 are shown for use about each of a plurality of receptacles, the shields may be used with any number, size and shape of light-emitting devices. In the preferred embodiment, the shields 140, 142 extend approximately one-eighth of an inch from the top surface of the mounting plate 112.

Figure 13:
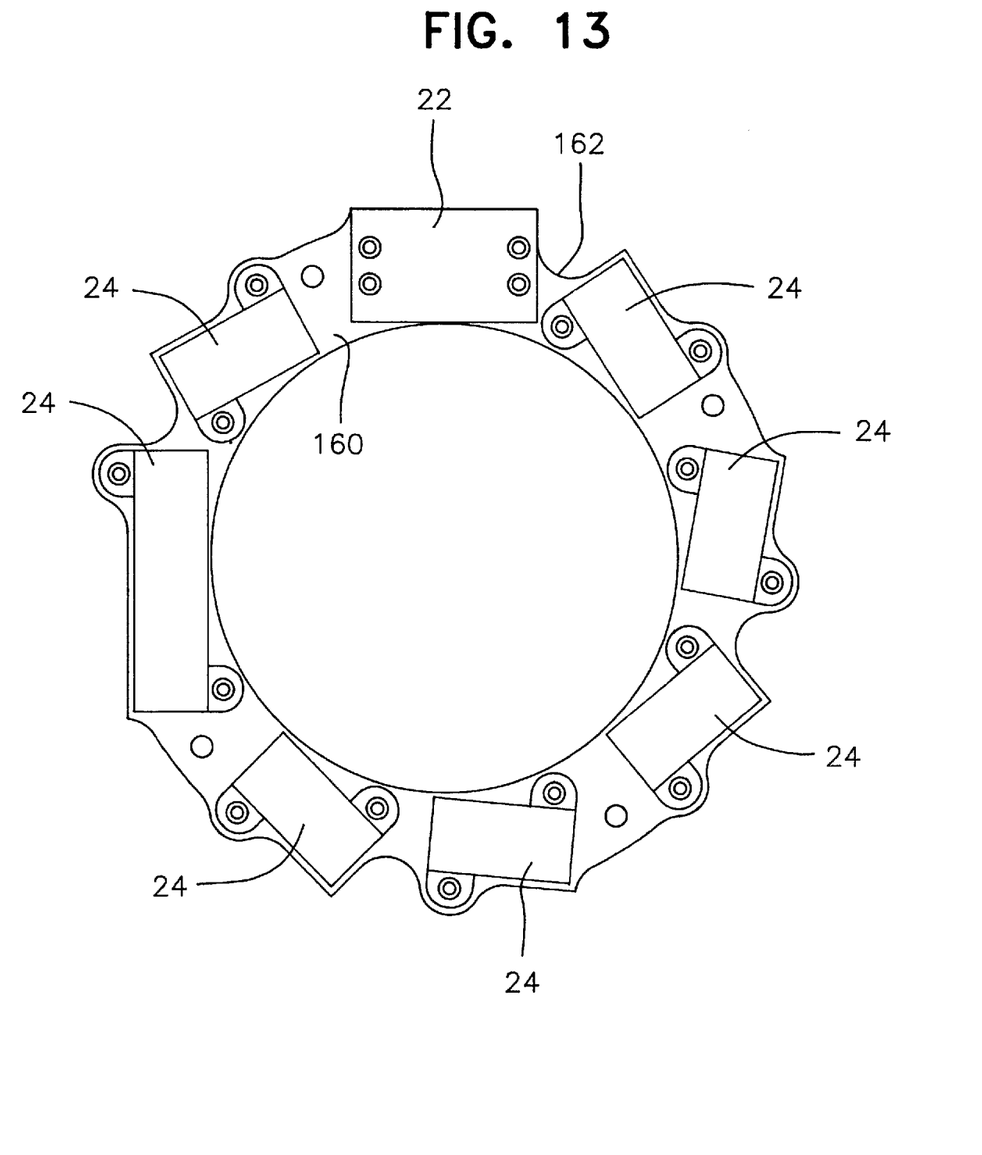
FIG. 13 is a bottom view of a power conditioning and retaining ring in accordance with an alternative embodiment of the invention.

FIG. 13 shows an alternative arrangement for the power conditioning and retaining ring 120 comprising a mounting plate 160. The underside of the mounting plate 160 is fitted with resistors 124 and input terminals 122. The outer border 162 of mounting plate 160 is irregular in order to conform with the shape of the resistors 124 and input terminals 122. The mounting plate 160 significantly reduces weight of the power conditioning and retaining ring 120.

In addition, the protective lens 10 may be coated with a material that can be penetrated by infrared light. Preferably, a dichrolic coating is used that allows infrared light emitted by LEDs 128, 132 to pass unobstructed. However, the coating is not applied in the center of the protective lens 110, so that visible light emitted by the halogen lamp 118 may also pass through lens 110. In addition, the dichrolic coating (not shown) tints the protective lens 110 so that the internal features of the system 200 are difficult to distinguish without dismantling the system 200. Thus, the features and capabilities of the system 200 will not be readily apparent by a visible inspection of the system 200. Any material may be used that permits light to pass unobstructed, yet prevents persons from being able to view the internal components of the system 200, and is able to be coated on the inside surface of a protective lens 110.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. For example, the shields 140, 142 need not be a single continuous element. Rather, the shields 140, 142 may comprise a plurality of independent segments that each individually circumscribe a portion of a single receptacle 146. In addition, the shields 140, 142 may encircle more or less than one-half of receptacle 146, as desirable for the particular application. Therefore, it is not desired to limit the invention to the specific examples disclosed or the exact construction and operation shown and described. Rather, all suitable modifications and equivalents may be resorted to, falling within the scope of the invention.

We claim:

1. A mounting plate for using with an illumination system having at least one illumination source for use as a landing light on an aircraft having a cockpit, the mounting plate comprising;

at least one receptacle in said mounting plate for receiving the at least one illumination source; and, at least one shield protruding outward from a surface of said mounting plate and surrounding at least a portion of said receptacle, wherein said shield obstructs light emitted by said illumination source that would otherwise impinge upon the cockpit of the aircraft.

2. The mounting plate of claim 1, wherein said shield is arranged to obstruct a portion of light emitted by the illumination source contained in said receptacle.

3. The mounting plate of claim 1, further comprising a plurality of receptacles and a plurality of illumination sources, each of the plurality of receptacles receiving one of said plurality of illumination sources, wherein said shield surrounds at least a portion of the plurality of said receptacles.

4. A mounting plate for use with an illumination system having a plurality of illumination sources, the mounting plate comprising:

a plurality of receptacles in said mounting plate, each of said receptacles receiving one of the plurality of illumination sources;

at least one shield protruding outward from a surface of said mounting plate and surrounding at least a portion of said receptacle; and, a plurality of lenses, each of said plurality of lenses received in one of said plurality of receptacles so as to be aligned with one of said plurality of illumination sources.

5. A mounting plate for use with an integrated illumination unit comprising a central opening in the mounting plate, said central opening retaining a first illumination source, said mounting plate having a top surface and a plurality of receptacles in said top surface located about said central opening, each receptacle receiving one of a plurality of second illumination sources, and at least one shield protruding outward from the top surface of said mounting plate, said shield surrounding at least a portion of said plurality of receptacles.

6. A mounting plate of claim 5, wherein said shield is arranged to obstruct a portion of light emitted by the second illumination source contained in said receptacle.

7. The mounting plate of claim 5, wherein said plurality of receptacles are symmetrically arranged, a first shield surrounding at least a portion of a first set of receptacles, and a second shield surrounding at least a portion of a second set of receptacles different than said first set of receptacles.

8. The mounting plate of claim 7, wherein said receptacles each has an inner periphery and an outer periphery with respect to a center of the symmetrically arranged receptacles, and said first shield surrounds said outer periphery of said first set of receptacles and said second shield surrounds said inner periphery of said second set of receptacles.

9. The mounting plate of claim 7, wherein the integrated illumination unit is for use as a landing light on a wing of an aircraft, said first shield is located toward a body of the aircraft, and said second shield is located toward a tip of the wing.

10. The mounting plate of claim 5, wherein the integrated illumination unit is for use as a landing light on an aircraft, and said shield obstructs light emitted by said second illumination source that would otherwise impinge upon a cockpit of the aircraft.

11. The mounting plate of claim 5, further comprising at least one lens, each lens fitting in one of said receptacles so as to be aligned with one of said second illumination sources.

12. The mounting plate of claim 5, wherein the first illumination source is a different type than the second illumination sources.

13. A mounting plate for use with an integrated illumination unit having at least one illumination source, the mounting plate comprising a top surface, a plurality of receptacles in said top surface, each receptacle having an inner periphery and an outer periphery, with respect to a center of a circle of said receptacles, and receiving one of a plurality of second illumination sources, first and second shields protruding outward from the top surface of said mounting plate, said first shield surrounding the outer periphery of a first set of receptacles and said second shield surrounding an inner periphery of a second set of receptacles different than said first set of receptacles.

14. The mounting plate of claim 13, wherein the illumination system is for use as a landing light on a wing of an aircraft, said first shield is located toward a body of the aircraft, and said second shield is located toward a tip of the wing.

* * * * *